Figure 1:
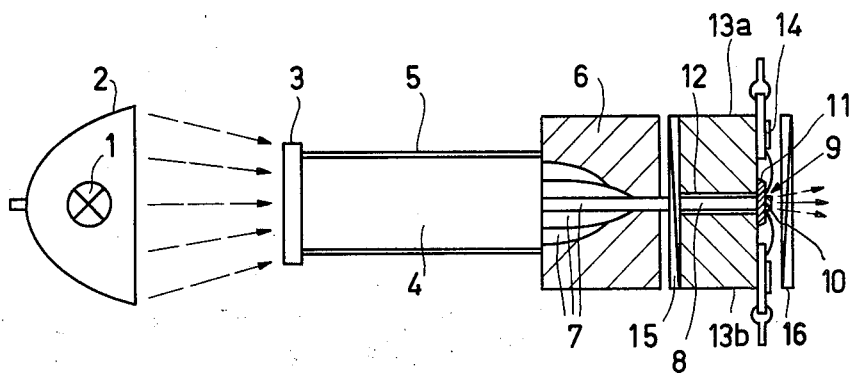

United States Patent [19]

Hill et al.

[11] Patent Number: 4,482,214
[45] Date of Patent: Nov. 13, 1984

[54] DEVICE FOR APPLYING LIGHT TO A LINEAR ARRAY OF MAGNETO-OPTICAL LIGHT SWITCHES, NOTABLY FOR OPTICAL PRINTERS

[75] Inventors: Bernhard Hill, Hamburg; Gerd Much, Norderstedt, both of Fed. Rep. of Germany

[73] Assignee: U.S. Philips Corporation, New York, N.Y.

[21] Appl. No.: 377,635

[22] Filed: May 12, 1982

[30] Foreign Application Priority Data

May 19, 1981 [DE] Fed. Rep. of Germany ....... 3119784

[51] Int. Cl.³ .................. G02B 5/16; G02B 5/172; G02F 1/09
[52] U.S. Cl. .................. 350/355; 350/96.10; 350/96.27; 350/388
[58] Field of Search .............. 350/96.10, 96.24, 96.27, 350/345, 353, 355, 356, 377, 388

[56] References Cited

U.S. PATENT DOCUMENTS

| | | | |
|---|---|---|---|
| 2,589,569 | 3/1952 | Peter et al. | 350/96.10 |
| 3,546,438 | 12/1970 | Buc et al. | 350/96.10 |
| 3,859,536 | 1/1975 | Thiel | 350/96.10 |
| 3,962,702 | 6/1976 | Kriege | 350/96.10 |
| 4,017,157 | 4/1977 | Van Riet | 350/345 |

OTHER PUBLICATIONS

Marks, L. V., "Optical Multiplexor for Apertured Document Reading", IBM Tech. Disc. Bull., 3-1971, p. 3006.

Bolotov et al, "50-Channel Light-Pulse Generator", Instruments & Experimental Techniques", May–Jun. 1975, pp. 909-911.

*Primary Examiner*—William H. Punter
*Attorney, Agent, or Firm*—Robert T. Mayer; Algy Tamoshunas

[57] ABSTRACT

A device for illuminating a line-shaped light switching mask having a plurality of magneto-optical light modulation elements and which is arranged between polarizers, comprising a light source, an optical transmission system for transmitting as large as possible part of the light emitted by the light source to the light switching mask, and at least one optical body which is arranged in the light path between the light source and the light switching mask in order to homogenize the light distribution. The optical transmission system comprises an adapter whose entrance surface corresponds to the geometry of the light source and whose exit surface corresponds to the geometry of the line-shaped light switching mask and a thin light conductor plate. The line direction of the exit surface of the adapter as well as that of the light switching mask extends in the plane of said plate.

11 Claims, 2 Drawing Figures

U.S. Patent   Nov. 13, 1984   4,482,214

DEVICE FOR APPLYING LIGHT TO A LINEAR ARRAY OF MAGNETO-OPTICAL LIGHT SWITCHES, NOTABLY FOR OPTICAL PRINTERS

The invention relates to a device for illuminating a line-shaped light switching mask having a plurality of magneto-optical light modulation elements and which is arranged between polarizers, comprising a light source as well as a transmission optical system for transmitting an as large as possible part of the light emitted by the light source to the light switching mask, and also comprising at least one optical body which is arranged in the light path between the light source and the light switching mask in order to homogenize the light distribution.

Light switching masks comprising a linear array of magneto-optical light modulation elements, for example, iron garnet layers, are generally known, for example, from DE-OS No. 26 06 596. When arranged between polarization foils, they form so-called "light valves" whose optical transmission can be varied by variation of the magnetization direction of the relevant magneto-optical modulation elements.

From DE-OS No. 28 12 206, corresponding to U.S. Pat. No. 4,278,981 it is known to provide magneto-optical printers with such light valves. The light switching masks are then illuminated by means of a tubular lamp, via an imaging system consisting of lenses and deflection mirrors, so that in transmission an electronically switchable light dot raster can be produced, for example, in the form of a row of light dots. Using a further optical system, this light dot raster is imaged on a record carrier, for example, on a photo-graphic material or electro-photographic material. The record carrier can be mechanically transported along the row of light dots in the direction perpendicular thereof, the record carrier thus being line-wise exposed.

In magneto-optical printers of this kind it is inter alia important to illuminate the light switching masks with a comparatively high intensity and as uniformly as possible in order to obtain a perfect printed image. One problem in doing this in that the surface of a row of dots to be illuminated corresponds to a long and very thin strip; hence it does not correspond to the customary geometry of lamps. For example, the magneto-optical modulation elements of a light switching mask have an optical aperture of from 50 to 100 μm and together they cover the width of a DIN A 4 sheet format of approximately 20 cm. Thus, a surface area of approximately 100 μm×20 cm is to be illuminated.

For the illumination of such a row, said DE-OS No. 28 12 206 proposes an elongate tubular lamp whose light is applied to the light switching mask by means of a cylinder lens. The longitudinal axis of the cylinder lens extends parallel to the longitudinal direction of the lamp. When lamps having a different geometry are used, however, the transmission system consisting of a cylinder lens and a deflection mirror no longer suffices for the uniform illumination of the light switching mask. The mask would then receive less radiation in its extremities than at its centre. This cannot be remedied by a scatter disc which generates diffuse light and which is arranged between the light switching mask and a deflection mirror.

It is an object of the invention to provide a device by means of which line-shaped light switching masks can be uniformly illuminated also in the case of light sources which are not line-shaped.

This object is achieved in accordance with the invention in that the optical transmission system comprises an adapter whose entrance surface corresponds to the geometry of the light source and whose exit surface corresponds to the geometry of the line-shaped light switching mask, between the adapter and the light switching mask there being arranged a thin light conductor plate, the line direction of the exit surface of the adapter, as well as that of the light switching mask, extending in the plane of said light conductor plate.

Due to the use of the adapter as an optical transmission system, the light from lamps of different geometry can be optimally distributed over a line-shaped switching mask. The adapter may consist of a large number of optical fibres of glass or plastic which are differently combined (bundled) at both ends in order to correspond to the relevant geometry. For example, the optical fibres could be arranged at one end so that they form a section of 100 μm×20 cm and at the other end so that they form a round section of the same surface area. Round entrance sections are particularly suitable for application of light from point-shaped light sources, for example, commercially available halogen cold light reflector lamps. However, the adapter may in principle also have other entrance geometries or exit geometries for optimum adaptation to other lamp shapes.

Due to the light conductor plate arranged between the exit surface of the adapter and the light switching mask, the radiation emerging from the adapter is homogenized, so that it is uniformly distributed over the light switching mask. This is achieved by multiple reflection of the light between the plate surfaces.

The inclusion of such a light conductor plate is particularly attractive when the adapter is composed of a number of separate optical fibres and, at its exit surface, a light distribution exists in accordance with the arrangement and structure of the usually circular optical fibres which do not completely fill the exit surface, not even in the case of a very dense packing. The structure of the optical fibres would then appear in the printed picture.

Between the light source and the adapter, in a preferred embodiment in accordance with the invention, there is additionally arranged a light conductor rod which extends in the direction of the incident light and whose cross-section corresponds, at least approximately, to the cross-section of the entrance surface of the adapter.

Due to the light conductor rod, inhomogeneous light distributions already present on the entrance of the adapter are compensated for by multiple reflection of the light on the inner side of the light conductor rod, so that the light incident on the light switching mask is even more uniformly distributed.

Figure 2:
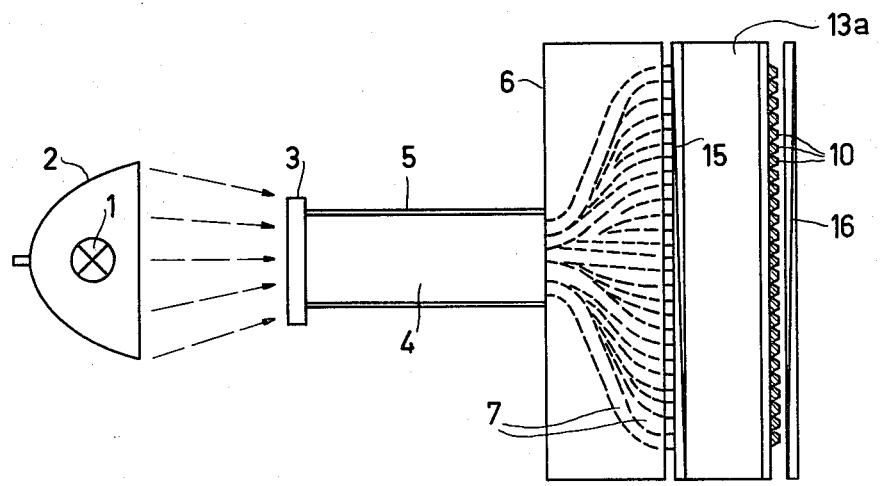

The drawing shows an embodiment in accordance with the invention, wherein:

FIG. 1 shows a device for illuminating a line-shaped light switching mask, comprising an adapter consisting of separate optical fibres, and FIG. 2 is a plan view of the device shown in FIG. 1.

The illumination device shown in FIG. 1 comprises a point or radially symmetrical lamp 1, for example, a commercially available halogen cold light reflector lamp. Its reflector 2 is constructed so that the light emitted by the lamp 1 is radiated substantially completely, via a heat protection filter 3, into a light conductor rod 4 which has a circular cross-section. The light conductor rod 4 has a length of a few centimeters and serves to compensate for any inhomogeneities in the light distribution. This is achieved in that the light which is applied to the light conductor rod 4 from the lamp 1 is repeatedly reflected inside the light conductor rod 4 from its outer walls, so that the light distribution is homogenized. The light conductor rod 4 may be a glass rod or a transparent plastic rod which is surrounded by air. In order to improve its reflective properties, moreover, the exterior of the rod may be provided with a layer 5 of a reflective material, for example, a metal layer, or a layer having a refractive index which is smaller than that of the light conductor rod 4. Alternatively, the light conductor rod 4 may be constructed as a hollow rod having an internal reflective surface (i.e. a hollow light conductor), for example, a reflective duct in a basic body.

The exit surface of the light conductor rod 4 is optically connected to the entrance surface of an adapter 6 which comprises, for example, a plurality of separate optical fibres 7. The optical fibres 7 are collected at the entrance side of the adapter 6 to form a circular bundle which is symmetrically arranged with respect to the exit surface of the light conductor rod 4. The two surfaces may be interconnected, for example, by means of cement. At the exit side of the adapter 6, the optical fibres 7 are adjacently arranged along a straight line as shown in FIG. 2. Due to the rod 4, each optical fibre on the exit side outputs substantially the same amount of radiation so that all optical fibres appear equally bright.

The light distribution thus obtained along a straight line, however, is still inhomogeneous in that it is disturbed by the structure of the optical fibres 7 itself. The optical fibres 7 usually have a circular cross-section so that along the straight line alternating brighter and darker zones are formed, even when the packing of the optical fibres is as dense as possible.

In order to compensate for such inhomogeneities in the light distribution, the radiation emerging from the optical fibres 7 is conducted in a light conductor plate 8 so that the direction of propagation of the light is substantially parallel to the plate surface. The light distribution is then homogenized by multiple reflection of the light between the plate surfaces. The light emerging from the end face of the light conductor plate is incident on a light switching mask 9 comprised of a plurality of magneto-optical light modulation elements 10 which are arranged on a substrate 11. The line-shaped light switching mask 9 (i.e. the array of light modulation elements 10) extends parallel to and opposite the array of optical fibres emerging from the adapter 6. The light conductor plate 8 is thus situated in a plane which extends through the array of optical fibres 7 emerging from the adapter 6 and the line of the light switching mask 9 or the array of light modulation elements 10. Perpendicularly to the array of light modulation elements 10, the light conductor plate 8 has a thickness which corresponds approximately to the dimension of the light modulation elements 10 in this direction. For the homogenizing of the light distribution, however, the width of the light conductor plate 8 in the direction of the incident radiation amounts to a few centimeters whilst the length of the light conductor plate 8 is adapted to the length of the array of light modulation elements 10 (or the length of the array of optical fibres 7).

The light conductor plate 8 may be constructed, for example, as a glass plate or a transparent plastics plate. It has a refractive index which is higher than that of the surrounding medium, so that the light is conducted by total reflection within the light conductor plate 8. This can be achieved in practice by embedding the light conductor plate 8 in a layer of cement 12 which has a thickness of at least several μm and a refractive index which is smaller than that of the light conductor plate 8. However, the light conductor plate 8 may alternatively be covered with a reflective layer, for example, a metal layer, with the exception of its end faces or light entrance and exit surfaces.

The "light conductor plate" may alternatively be constructed as a hollow light conductor having a rectangular internal cross-section (for example, a slit in a metal block) and internally reflective surfaces.

The complete light conductor plate 8 is supported by two rectangular supporting strips 13a, 13b, which may consist of, for example, metal or plastic or the like, the width of the supporting strips corresponding to the width of the light conductor plate 8. The supporting strips 13a, 13b can be used as supports for the light switching mask 9 as well as for the integrated circuits 14 required for the electronic control thereof. The electronic circuits 14 are arranged on both sides of the light switching mask 9 and are connected thereto, for example, by bonding.

The light switching mask 9 is preferably connected to the light conductor plate 8 by way of a layer of cement. This is also applicable to a polarizer 15 which is situated at the entrance side between the adapter 6 and the light conductor plate 8. The polarizer 15 is also supported by the supporting strips 13a, 13b. A polarizer 16 at the exit side is situated behind the light switching mask 9, viewed in the radiation direction.

As is shown in the FIGS. 1 and 2, the adapter 6 is arranged as near as possible to the light conductor plate 8 (or the entrance polarizer 15). Preferably, the optical fibres 7 are cemented to the polarizer at their exit side. The advantage of cementing the individual optical elements to one another consists in that the light applied to the light conductor rod 4 is conducted to the light switching mask 9 substantially without loss.

A spherically symmetrical halogen cold light reflector lamp is used in the FIGS. 1 and 2 by way of example. However, other light sources such as, for example, gas discharge lamps which possibly have a different geometry may alternatively be used. The entrance surface of the adapter 6 should then be adapted to the relevant lamp geometry. For that purpose the optical fibres 7 can be bundled in a corresponding manner at the entrance side. Evidently, the cross-section of the light conductor rod 4 must be adapted to the different entrance surface of the adapter 6 and the different lamp geometry.

What is claimed is:

1. A device for illuminating a line-shaped light switching mask having a plurality of magneto-optical light modulation elements arranged between polarizers, said device comprising a light source, an optical transmission system for transmitting light emitted by said light source to the light switching mask, and means for homogenizing the distribution of light transmitted to the light switching mask, said optical transmission system including an adapter having an entrance surface which corresponds to the geometry of said light source and an exit surface which corresponds to the geometry of the line-shaped light switching mask, and a light conductor rod arranged between said light source and said adapter and extending in the direction of the incident light, said rod having a cross-section corresponding at least approximately to said entrance surface of said adapter, and wherein said homogenizing means includes a thin light conductor plate arranged between said adapter and said light switching mask so that the longitudinal direction of said exit surface of said adapter was well as that of the light switching mask are parallel to the plane of said light conductor plate.

2. The device according to claim 1 wherein said adapter is comprised of a plurality of optical fibers.

3. The device according to claim 1 or 2 wherein at least one of said light conductor plate and said rod is made of a transparent material and, except for the entrance and exit surfaces thereof, is surrounded by a medium having a refractive index which is smaller than that of said material.

4. The device according to claim 3 wherein said material is glass.

5. The device according to claim 3 wherein said material is a plastic.

6. The device according to claim 1 or 2 wherein at least one of said plate and rod is made of a transparent material and except for the entrance and exit surfaces thereof, is surrounded by a reflective layer.

7. The device according to claim 1 including a member for supporting the light switching mask, said light conductor plate being secured to said support member.

8. The device according to claim 1 or 7 wherein one of the polarizers is disposed between said adapter and said conductor plate and secured to said conductor plate.

9. The device according to claim 1 wherein said light source is approximately point symmetrical and said entrance surface of said adapter is circular.

10. The device according to claim 1 including a heat protection filter arranged between said light source and said light conductor rod.

11. The device according to claim 1 or 2 wherein at least one of said light conductor rod and said light conductor plate is hollow and has a reflective internal surface.

* * * * *